J. M. LITHGOW & J. S. SHERWOOD.
FILTER PLATE.
APPLICATION FILED APR. 3, 1911.

1,011,976.

Patented Dec. 19, 1911.

WITNESSES:
J. Herbert Bradley.
Francis J. Tomasson.

INVENTORS
John M. Lithgow
John S. Sherwood
by Christy & Christy Atty's

COLUMBIA PLANOGRAPH CO., WASHINGTON, D. C.

UNITED STATES PATENT OFFICE.

JOHN M. LITHGOW, OF BEAVER FALLS, AND JOHN S. SHERWOOD, OF NEW BRIGHTON, PENNSYLVANIA, ASSIGNORS TO KNOTT & HARKER COMPANY, OF BEAVER FALLS, PENNSYLVANIA, A CORPORATION OF PENNSYLVANIA.

FILTER-PLATE.

1,011,976.  Specification of Letters Patent.  Patented Dec. 19, 1911.

Application filed April 3, 1911. Serial No. 618,718.

*To all whom it may concern:*

Be it known that we, JOHN M. LITHGOW, residing at Beaver Falls, county of Beaver, and State of Pennsylvania, and JOHN S. SHERWOOD, residing at New Brighton, in the county of Beaver and State of Pennsylvania, and both citizens of the United States, have invented or discovered certain new and useful Improvements in Filter-Plates, of which improvements the following is a specification.

The customary practice, in separating a solid substance from a fluid, as for example, washed potters' clay from water, is to mount a series of rib-surfaced filter-plates, suitably separated by canvas filter-cloths and provided with a central passageway therethrough, upon a rack, and pump the fluid solution, under pressure into the spaces between the canvas-separated plates. In this operation the solid substance remains within such spaces, while the fluid filters through the canvas and finds its escape along suitable passages, provided in the filter-plate. During the filtering operation, and particularly at the beginning thereof, the throbs of the pump are felt throughout the liquid, to the extent of causing the filter canvas to move over the ribbed-surfaces of the filter-plates. For this and other reasons, incident upon the conditions of service, the filter canvases frequently cut or wear through, thereby permitting an escape of the solution, which, at least, causes a very great inconvenience.

Our invention relates to the construction of such filter-plates, and the object of our invention is to provide a plate, wherein the wear upon the canvas will be reduced.

A further object of our invention is to provide a filter plate, wherein the undesirable features, incident upon a breaking of a canvas, may be largely eliminated.

Our invention is illustrated in the accompanying drawing, which forms part of the specification, and in which—

Figure 1:
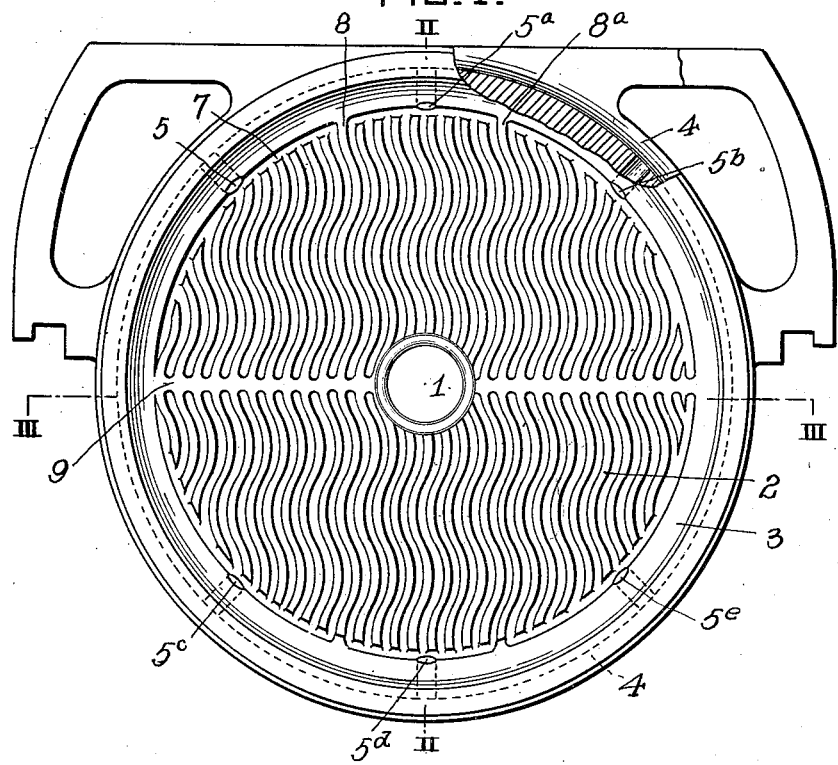
Figure 2:
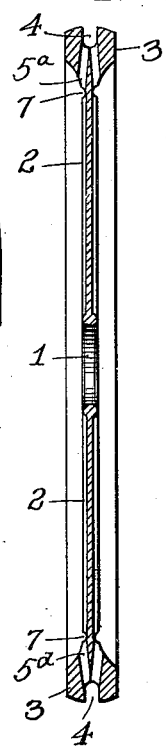
Figure 3:
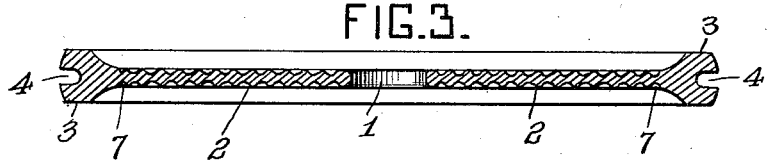
Figure 4:
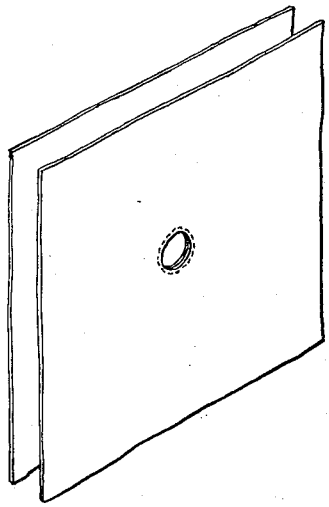

Figure 1 is a face view of a filter-plate embodying our invention; Fig. 2 a sectional view taken on the line II—II, Fig. 1; Fig. 3 a sectional view taken on the line III—III, Fig. 1; and Fig. 4 a perspective view of a filter cloth.

In the several figures like numerals are used to designate like parts.

As shown herein, the filter plate preferably consists of a circular ribbed area 2, having a central passageway 1 therethrough, surrounded by rim 3, preferably thicker than the said ribbed area, said rim being provided with a peripheral groove 4, having communication with the ribbed area through the ports 5, $5^a$, $5^b$, $5^c$, $5^d$, and $5^e$. And, it will be understood of this construction that the liquid, filtering through the canvas, gathers in the recessed portions of the filter-plate and escapes therefrom through the said ports. To the end that the filtered liquid may have an unobstructed passage from the depressed portions of the ribbed area to the said ports, a passageway 7 may be formed at the ends of the ribs by suitably stopping such ribs short of the rim 3, as shown. And this passageway is preferably made discontinuous by extending certain ribs 8 and $8^a$ to meet the rim 3, to the end that, whatever liquid is filtered or escapes through the filter-cloths to one side or the other thereof, may escape to the groove 4 only through the ports disposed on the side of escape. In other words the rib 8 may interrupt the passageway 7 so that all liquid escaping to the left of the said rib may find an outlet to the groove 4 only through the ports 5 and $5^e$. To further control the escape of the liquid a diametrical transverse rib 9 may be formed, so that such liquid, as escapes above the rib 9 and to the left of the rib 8, may flow into the groove 4, only through the port 5. It will be readily understood, from the above description, that similar restricted areas of escape may be controlled by the other ports $5^a$, $5^b$, $5^c$, $5^d$ and $5^e$.

When a rupture occurs in a filter cloth and the unfiltered solution escapes therethrough, it is desirable to effectively prevent its escape. To such end the groove 4 is preferably open exteriorly substantially throughout its entire extent, so that ready access may be had to any of the said several ports for inserting a plug therein. It will be understood that, in so much as each port drains but a relatively small area of the filter-plate, it will be necessary, when a rupture occurs in a filter-cloth, to plug only such port or ports as drain the area or areas wherein the rupture occurs, and that the remainder of the filter-plate area will continue to be effective for filtering.

We have discovered that, when using filter-plates, having straight ribs, the filter-cloths wear through rapidly, and that, when such ruptures occur in filter-cloths, used with such filter-plates, they appear to be cut rather than worn areas in the cloths. Such rapid and undesirable cutting of the cloths we attribute to their movement over the filter-plate ribs, as heretofore described, and we find that the same is greatly reduced by the use of irregularly shaped ribs, which tend to distribute the cutting effect over appreciable areas. And we find that this cutting is most effectively reduced by using sinuously shaped ribs, preferably disposed in a generally parallel relation.

We do not wish to limit ourselves to the details of construction shown herein, for, obviously, many changes may be made therein without departing from the spirit of our invention.

We claim as our invention:

1. A filter-plate having a passageway opening through it and provided with a ribbed and grooved area extending adjacent to said passageway, said plate further provided with a rim grooved around its perimeter, and with ports providing communication from said ribbed and grooved surface to said peripheral groove, each of said ports providing an outlet for a plurality of said surface grooves, said peripheral groove being open externally and affording access to each of said communicating ports, substantially as described.

2. A filter-plate having a passageway therethrough, a ribbed area, a rim, a peripheral groove, communicating ports between said ribbed area and said groove, and ribs for limiting the area drained by each port, substantially as described.

3. A filter-plate having a passageway therethrough surrounded by a ribbed area, a rim having an open peripheral groove provided with ports communicating with said ribbed area, said ribbed area provided with sinuous ribs to diminish the cutting of filter cloths, substantially as described.

4. A filter-plate having a passageway therethrough, an area surrounding said passageway provided with sinuously shaped ribs, a peripheral rim having an open peripheral groove, ribs dividing said ribbed area into a plurality of separately-drained areas, and a plurality of ports each providing a passageway from each of said separately-drained areas to said peripheral groove, substantially as described.

In testimony whereof we have hereunto set our hands.

JOHN M. LITHGOW.
JOHN S. SHERWOOD.

Witnesses:
CHARLES F. BUTSCH,
FRANK KENNEDY, Jr.

---

Copies of this patent may be obtained for five cents each, by addressing the "Commissioner of Patents, Washington, D. C."